United States Patent [19]
Glance

[11] Patent Number: 5,799,991
[45] Date of Patent: Sep. 1, 1998

[54] MOLDED BUMPER SYSTEM WITH REINFORCEMENT BEAM

[75] Inventor: Patrick M. Glance, Plymouth, Mich.

[73] Assignee: Concept Analysis Corporation, Plymouth, Mich.

[21] Appl. No.: 735,528

[22] Filed: Oct. 23, 1996

[51] Int. Cl.$^6$ .................................................. B60R 19/03
[52] U.S. Cl. .................................................. 293/121; 293/109
[58] Field of Search .................................. 293/102, 108, 293/109, 110, 120, 121, 132, 136, 142

[56] References Cited

U.S. PATENT DOCUMENTS 4,252,355  2/1981  Goupy et al. ............................ 293/120
5,658,027  8/1997  Eissinger et al. ........................ 293/121

Primary Examiner—Jesus D. Sotelo

[57] ABSTRACT

The bumper system includes an elongated body member with a cavity extending along at least a portion of a length of the body member, a beam member positioned in the cavity in close fitting engagement, and an attachment device for attaching the bumper system to a preselected structure. The body member cavity has a predetermined cavity cross-sectional shape and the beam member has a corresponding cross-sectional shape. The body member is constructed in one piece of a resilient, moldable material. The corresponding cross-sectional shapes of the body member cavity and the beam member are adapted to maximize torsional force transfer between the body member and the beam member. The beam member is configured to meet strength requirement with minimal mass. In one embodiment, at least one absorber member is interposed between the body member and the preselected supporting structure. The absorber member is resilient and adapted to deform to absorb an impact force and to return to its original configuration when the force is removed. Further, the body member defines a cooperating receptacle for each absorber member to receive the absorber member in force fit engagement. Each of the body member and the beam member may also include a void that is filled with a foam material.

18 Claims, 2 Drawing Sheets

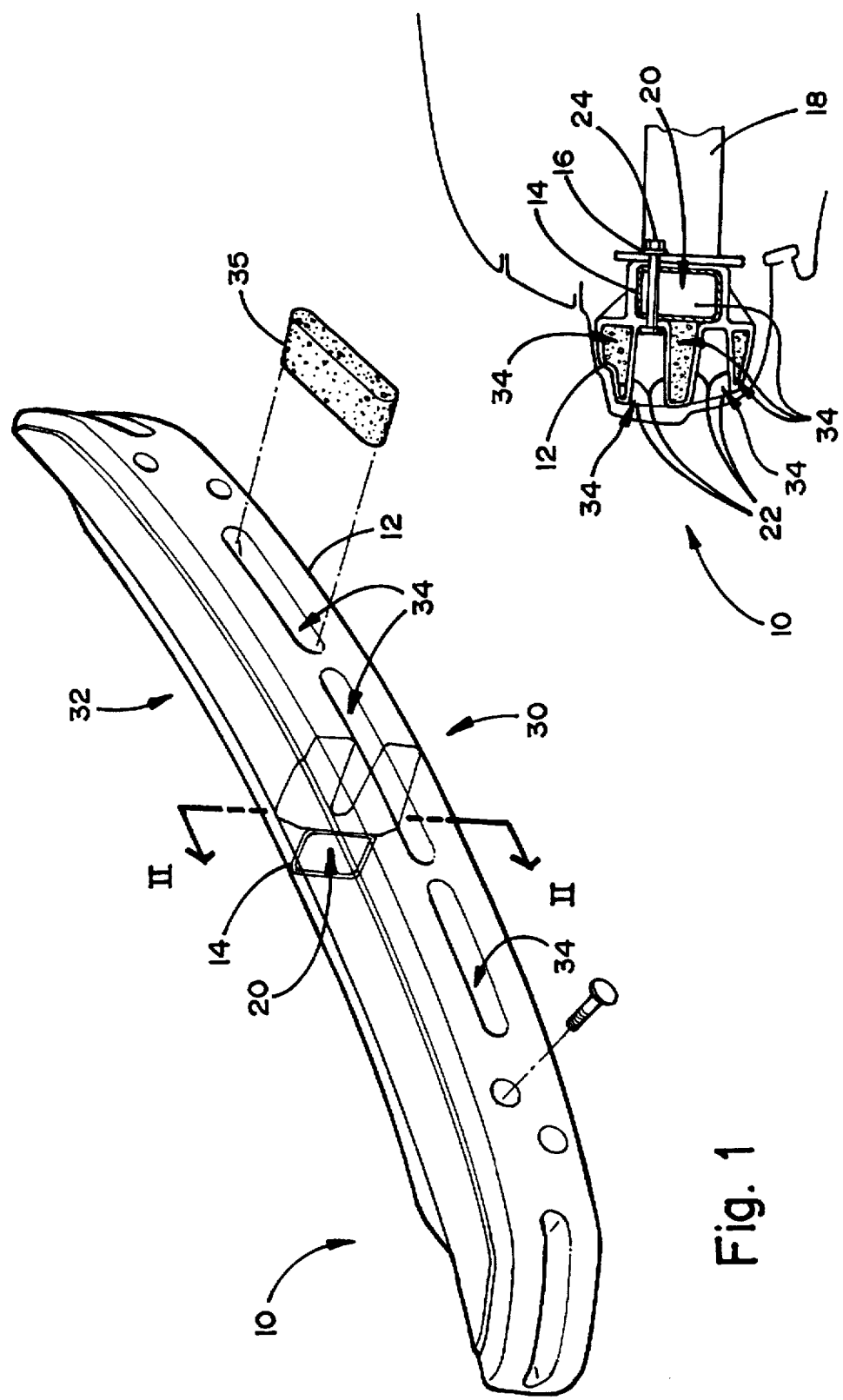

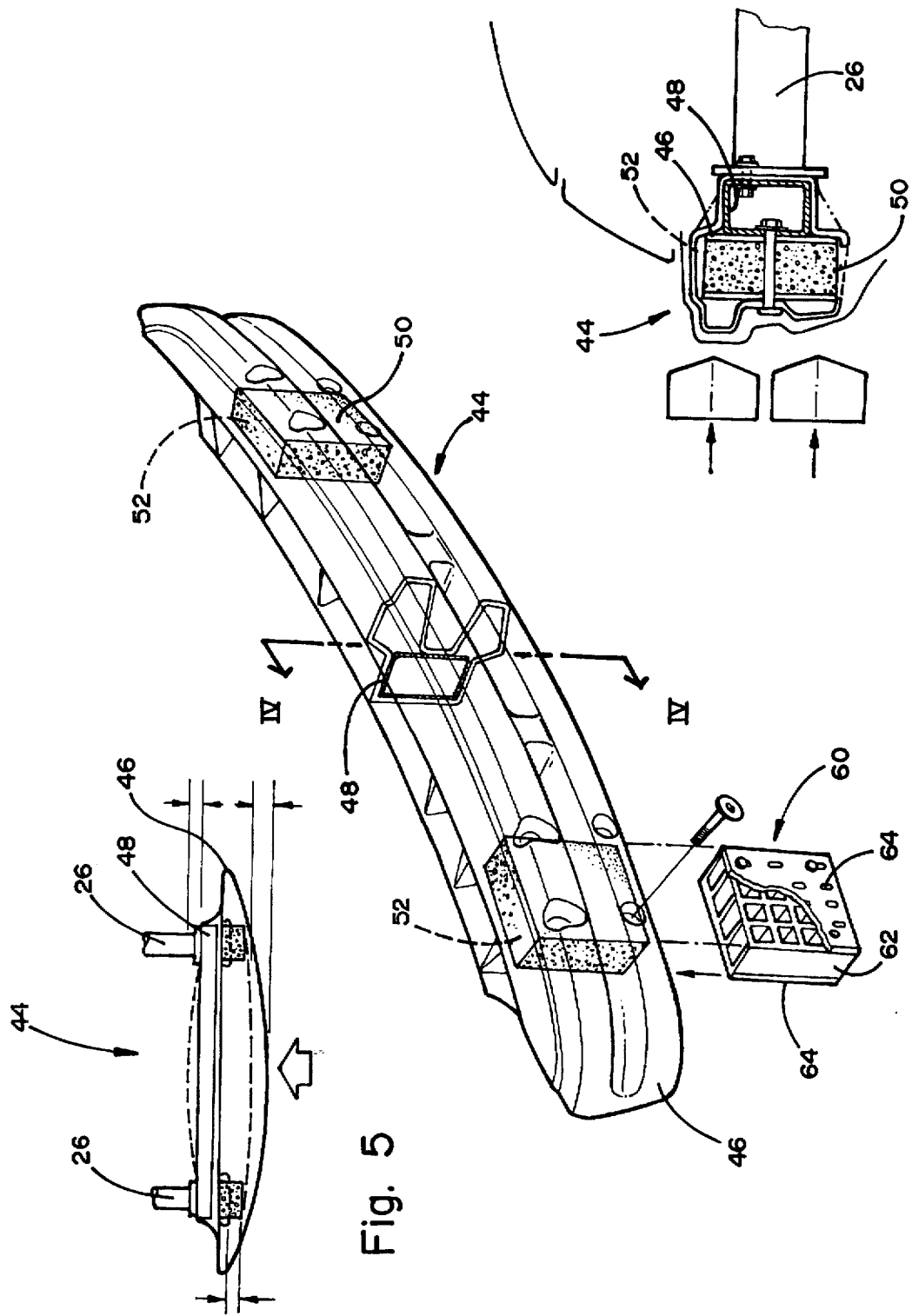

MOLDED BUMPER SYSTEM WITH REINFORCEMENT BEAM

BACKGROUND OF THE INVENTION

Most North American automotive bumper systems consist of three basic components, namely, a bumper beam, a bumper absorber, and a cover or facia. The bumper beam is usually metal, and the bumper absorber is commonly a stroking mechanical shock absorber device or a polypropylene foam block and the like. The cover is commonly a flexible facia that is molded from a urethane plastic.

A large majority of current North American bumper systems for light cars (under 3,600 pounds curb weight) consist of a metal or composite fiber reinforced beam, mounted fixed to the vehicle frame rails with a molded foam polypropylene absorber block mounted between the beam and the facia cover. The polypropylene foam provides energy absorption and supports the facia. This known system is generally considered to be relatively heavy and expensive, and to have performance limitations.

A large majority of current North American bumper systems for heavy cars (over 3,600 pounds curb weight) consist of a metal or composite fiber reinforced beam that is mounted on stroking hydraulic shock absorbing devices. Depending upon the particular styling and design application, the beam may be exposed with a finished surface, may be covered with a plastic surface or facia, or may support a contoured foam block that in turn supports a styled plastic facia. It is well understood that the required energy absorption capacity directly relates to the weight of the vehicle. In other words, a relatively heavier vehicle will require relatively higher levels of energy absorbing efficiency. Thus, heavy vehicles commonly rely on stroking shock absorbers instead of merely a foam block.

One exception to the common, known systems described above utilizes a blow molded plastic bumper beam that is contoured to also provide the facia support function. Although this system eliminates the discrete bumper absorber, it is generally criticized as being expensive and as having excessive impact rebound, rather than absorption, during low speed impact. This, unfortunately, results in relatively high occupant G-force loading, which results in occupant discomfort. Further, the known blow molded plastic bumper structures lack good impact characteristics when striking a pole and lack good high speed impact performance.

Thus, the presently known bumper systems fail to provide an effective, low cost, and low weight solution to the bumper requirement problem.

SUMMARY OF THE INVENTION

A bumper system according to the present invention cleverly provides a body member, with a beam member that is positioned in close fitting engagement with a cavity that is defined in the body member. The body member is preferably a one-piece construction of a resilient, moldable material. The body member cavity and the beam member cooperate to maximize torsional force transfer between the body member and the beam member. The unique interaction of the beam and body member provide ready adaptation of the invention to a very wide variety of bumper styles, designs, and applications.

In one embodiment, at least one additional absorber member is interposed between the body member and a preselected supporting structure, such as the frame rails of an automobile, for example. In this alternative embodiment, increased force load capacity is provided by the addition of the absorber member.

Thus, a bumper system according to the present invention provides high impact performance with low cost and weight as distinguished from the currently known bumper systems.

These and other features, objects, and benefits of the present invention will be recognized by those who practice the invention and by those skilled in the art, from the specification, the claims, and the drawing figures.

BRIEF DESCRIPTION OF THE DRAWINGS

FIG. 1 is a perspective view of a bumper system according to the invention, the view is partially broken away to show a center line cross-section.

FIG. 2 is a cross-sectional view along line I—I of FIG. 1, showing the bumper system attached to a vehicle.

FIG. 3 is the view of FIG. 1, showing a second embodiment of the invention.

FIG. 4 is a cross-sectional view along line V—V of FIG. 3, showing the bumper system attached to a vehicle.

FIG. 5 is a top plan view of the second embodiment of FIG. 3.

DETAILED DESCRIPTION OF THE PREFERRED EMBODIMENTS

Preferred embodiments of a molded bumper system with reinforcement beam are generally shown in the enclosed drawing FIGS. 1–5. More particularly, a first embodiment that is suitable for light duty application is shown in FIGS. 1 and 2, and is generally referenced by the numeral 10. The bumper system 10 includes an elongated body member 12, a beam member 14, and an attachment device 16 for attaching the bumper system to a preselected supporting structure 18 (FIG. 2), including vehicle frame rails, for example.

The body member 12 (FIGS. 1 and 2) is most preferably blow molded in one piece of a resilient thermoplastic material (such as high density polyethylene, polypropylene, thermoplastic rubber, olefin resin, or urethane, for example) that allows deformation and return of the body member 12 to its original configuration. The specific material used may also be a composite, including, but not limited to, fiber reinforcement. More particularly, a talc-filled high density polyethylene that is available from the Paxon Polymer Company's resin systems may be satisfactorily used to blow mold the body member 12. Accordingly, the specific method of construction may correspond to the specific material selected and to the circumstances under which the invention is being manufactured.

The body member 12 is provided with a cavity 20 (FIGS. 1 and 2) with a predetermined cross-sectional shape for housing the beam member 14. The cross-sectional shape and configuration as a whole, of the body member 12 will be defined by the specific styling or design use of the invention and by the force loads that are expected to be applied to the bumper system 10 in use. The body member 12 will typically be provided with stiffening elements 22 (FIG. 2), however.

In a vehicular or automotive application, the bumper system 10 will commonly be mechanically fastened by screws, rivets, or bolts 24 and the like to the ends of the vehicle frame rails 26. The bumper system 10 will commonly be mounted to the rails 26 at the front and the back of the vehicle. At either of these locations, the bumper system 10 may be said to have a front 30 (FIG. 1) or outward facing side and a back 32 or inward facing side. Further, a bumper system 10 that is used as just described, will predominately experience force loads that are applied to the front 30 of the bumper system 10. For a vehicular application, the cavity 20 is, therefore, most preferably located toward the back 32 of the body member 12, as shown.

As seen in FIG. 2, light weight design of the body member 12 will typically result in void spaces 34 in addition to cavity 20. Again depending upon the specific application, each void 34 may or may not be filled with a urethane foam or the like for additional structural integrity.

The beam member 14 will commonly be a simple beam member, such as a hollow, roll-formed, thin-walled, martensitic steel tube or the like. The beam member 14 may also, however, be fabricated from other suitable, structural materials, including, but not limited to, aluminum, magnesium, and structural plastics, with or without fiber reinforcement, for example. The beam member 14 will commonly extend between two generally parallel, longitudinal frame rails 26 and will provide mounting of the bumper system 10 to the frame rails 26 with bolts 24 or the like, as is discussed in greater detail above. The beam member 14 may be provided with a rectangular cross-sectional shape as is generally shown in the drawing figures, but may also be configured with other structurally desirable cross-sectional shapes. Most preferably, the cross-sectional shape will be selected to minimize the mass of the bumper system 10 and maximize torsional force transfer between the body member 12 and the beam member 14, and further between the beam member 14 and the frame rails 26. One having ordinary skill in the art will appreciate that the rectangular cross-sectional shape of the beam member 14 as shown provides a relatively high strength member with relatively minimal mass. Further, the beam member 14 is preferably designed to transfer impact forces to the frame rails 26 without catastrophic failure or fracture and with minimum permanent set of the beam member 14.

In use, the molded plastic body member 12 provides low speed vehicular impact energy management capability, while the reinforcing beam member 14 provides high speed vehicular safety and damagability performance capabilities. One having ordinary skill in the art will recall that safety regulations may require high and low position pendulum impact loading capabilities. The pendulum impact load capabilities of the bumper system 10 are provided by the molded plastic body member 12 and by transfer of the impact loading from the body member 12 to the reinforcement beam member 14.

Further, the bumper system 10 is conveniently integrated into various bumper requirement applications, including a need to substantially conceal the bumper system, as is currently widely used for automobiles and is generally shown in the enclosed drawings. More particularly with reference to FIG. 2, the reinforcing beam member 14 is attached to the frame rails 26 and supports the molded plastic body member 12. In turn, a vehicle facia extends around and generally encapsulates the body member 12 as is understood by one having ordinary skill in the art.

In a second embodiment 44 (FIGS. 3–5) of a bumper system according to the present invention, a body member 46 and beam member 48 are supplemented by at least one absorber member 50 for use of the invention in a relatively heavier duty application. Body member 46 is substantially the same as body member 12, discussed above, while beam member 48 is substantially the same as beam member 14, discussed above. Thus, only the differences of these components will be discussed further below.

In addition to the features discussed above relative to body member 12, body member 46 defines a cooperating receptacle 52 for each absorber 50. Each receptacle 52 is most preferably positioned relative to body member 46 so that the respective absorber 50 is aligned with a corresponding end of a frame rail 26 (FIG. 4 and 5). Also, each receptacle 52 will generally define a void space corresponding to the exterior configuration of the absorber 50. For ease of assembly, the absorber 50 and receptacle 52 are adapted for forced fit placement of absorber 50 into receptacle 52, with removal of absorber 50 from receptacle 52 either requiring force or being substantially prevented.

More particularly, each absorber 50 is a block of a resilient material that allows deformation of absorber 50 when a force is applied to the bumper system 44, and returns to the original configuration of absorber 50 when the force is removed. Each absorber 50 may be a block of polyethylene, polypropylene, urethan, ethylene vinyl acetate (EVA), polypropylene foam, or urethan foam and the like, for example. The particular method for fabricating absorber 50 will, of course, depend upon the material selected and may include, but not be limited to, injection molding and extruding.

As an alternative to using a block of material for absorber 50, a composite absorber 60 (FIG. 3) may be used, depending upon the anticipated loading requirements. The composite absorber 60 may include an injection molded or extruded, energy absorbing spacer 62 that is sandwiched between a pair of energy distribution plates 64. Further, spacer 62 may be an egg crate or honeycomb member or the like, for example. Spacer 62 may also be constructed of layers of materials that have differing energy absorbing qualities to provide a spacer 62, and absorber 60, with a selected energy absorbing contour. While composite absorber 60 may be made of various materials by various methods as discussed above regarding absorber 50, injection molding a thermoplastic-polyester elastomer is particularly well suited for making a honeycomb spacer 62.

As with the bumper system 10, described above, the second embodiment 44 of the invention provides low speed vehicle impact energy management with deflection of the body member 46 (FIG. 4), while high speed vehicle safety and damage ability performance are accommodated by the beam member 48, with the addition of the absorbers 50 providing additional energy absorption. The manner in which energy is absorbed by the bumper system 44 may further be tailored by placement of the absorbers 50 either between the body member 46 and the beam 48 or between the beam 48 and the frame rails 26, as will be understood by one having ordinary skill in the art.

It will be understood by those who practice the invention and by one having ordinary skill in the art that various modifications and improvements may be made to the present invention without departing from the spirit of the disclosed concept. The scope of the protection afforded is to be determined by the claims and by the breath of interpretation allowed by law.

I claim:

1. A vehicular bumper system comprising
   an elongated body member with a length and a cavity extending along said length, said cavity having at least one open end and having a closed cavity cross-sectional shape;

a beam member positioned in said cavity and extending along said length, said beam member having a cooperating beam cross-sectional shape that couples with said cavity in force fit engagement to transfer a rotational force that is applied to said body member to said beam; and an attachment device connected with said beam and adapted to attach said bumper system to a preselected supporting structure.

2. The bumper system defined in claim 1 wherein said body member is constructed of a resilient, moldable material.

3. The bumper system defined in claim 2 wherein said body member is a one-piece member.

4. The bumper system defined in claim 1 wherein said beam member is adapted to maximize torsional force transfer between said body member and said beam member and between said beam member and said preselected supporting structure.

5. The bumper system defined in claim 4 wherein said beam member is constructed of a high strength material and is configured to have a predetermined strength with a minimal mass.

6. The bumper system defined in claim 1 further including at least one absorber member, said at least one absorber member being interposed between said body member and said preselected supporting structure.

7. The bumper system defined in claim 6 wherein said at least one absorber member is a resilient member that is adapted to absorb at least a portion of a force that is applied to said body member and is adapted to return to its original configuration after the force is removed.

8. The bumper system defined in claim 7 wherein said body member defines a cooperating receptacle for each of said at least one absorber member and said at least one absorber member is forcibly retained in said cooperating receptacle.

9. The bumper system defined in claim 1 wherein at least one of said body member and said beam member further includes a void, and said void is filled with a foam material.

10. A vehicular bumper system comprising:

an elongated beam with a length and a beam cross-sectional shape;

an attachment device connected with said beam and adapted to attach said bumper system to a preselected supporting structure; and a body member extending along said length of said beam and having a cavity with said beam located in said cavity in force fit engagement with said body member, said cavity having at least one open end and having a cooperating closed cross-sectional shape that is adapted to couple with said beam cross-sectional shape to transfer a force that is applied to said body member to said beam.

11. The bumper system defined in claim 10 wherein said body member is constructed of a resilient, moldable material.

12. The bumper system defined in claim 11 wherein said body member is a one-piece member.

13. The bumper system defined in claim 10 wherein said beam member is adapted to maximize torsional force transfer between said body member and said beam member and between said beam member and said preselected supporting structure.

14. The bumper system defined in claim 13 wherein said beam member is constructed of a high strength material and is configured to have a predetermined strength with a minimal mass.

15. The bumper system defined in claim 10 further including at least one absorber member, said at least one absorber member being interposed between said body member and said preselected supporting structure.

16. The bumper system defined in claim 15 wherein said at least one absorber member is a resilient member that is adapted to absorb at least a portion of a force that is applied to said body member and is adapted to return to its original configuration after the force is removed.

17. The bumper system defined in claim 16 wherein said body member defines a cooperating receptacle for each of said at least one absorber member and said at least one absorber member is forcibly retained in said cooperating receptacle.

18. The bumper system defined in claim 10 wherein at least one of said body member and said beam member further includes a void, and said void is filled with a foam material.

* * * * *